(12) United States Patent
Pryor et al.

(10) Patent No.: US 11,795,721 B2
(45) Date of Patent: Oct. 24, 2023

(54) STRUCTURAL FUSE WITH INTEGRAL SPACER PLATES

(71) Applicant: Simpson Strong-Tie Company Inc., Pleasanton, CA (US)

(72) Inventors: Steven E. Pryor, Dublin, CA (US); Timothy S. Ellis, Thousand Oaks, CA (US); Brandon Y. Chi, Oakland, CA (US); Samuel T. Hensen, McKinney, TX (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

(21) Appl. No.: 17/382,555

(22) Filed: Jul. 22, 2021

(65) Prior Publication Data
US 2021/0348414 A1  Nov. 11, 2021

Related U.S. Application Data

(63) Continuation of application No. 16/570,906, filed on Sep. 13, 2019, now Pat. No. 11,072,938.

(51) Int. Cl.
*E04H 9/02* (2006.01)
*E04B 1/24* (2006.01)
*E04C 3/04* (2006.01)

(52) U.S. Cl.
CPC ........... *E04H 9/024* (2013.01); *E04B 1/2403* (2013.01); *E04B 2001/2415* (2013.01);
(Continued)

(58) Field of Classification Search
CPC .................. E04H 9/024; E04B 1/2403; E04B 2001/2415; E04B 2001/2442;
(Continued)

(56) References Cited

U.S. PATENT DOCUMENTS 1,744,600 A    1/1930  Wilcox
2,201,826 A    5/1940  Ditchfield
(Continued)

FOREIGN PATENT DOCUMENTS

CN    110219369 A  *  9/2019  ........... E04B 1/2403
JP    2009209592       9/2009
(Continued)

OTHER PUBLICATIONS

English Language Abstract for TW200936910 published Sep. 1, 2009.
(Continued)

*Primary Examiner* — Babajide A Demuren
(74) *Attorney, Agent, or Firm* — Vierra Magen Marcus LLP (57) ABSTRACT

A structural fuse is disclosed including a fuse base and a fuse plate extending from the fuse base. The fuse plate may include a reduced diameter yield section configured to yield at loads on the structural fuse above a threshold. The reduced diameter yield section includes a pair of slots on either side of the yield section, which slots receive a pair of spacers. The spacers are integrally formed as part of the fuse plate, and remain attached to the fuse plate during fabrication of the structural fuse.

13 Claims, 8 Drawing Sheets

(52) U.S. Cl.
CPC .............. *E04B 2001/2442* (2013.01); *E04B 2001/2448* (2013.01); *E04C 2003/0452* (2013.01)

(58) Field of Classification Search
CPC ...... E04B 2001/2448; E04C 2003/0452; F16F 7/12; F16F 2226/04; F16F 2236/02
See application file for complete search history.

(56) References Cited

U.S. PATENT DOCUMENTS

| | | | |
|---|---|---|---|
| 3,716,957 | A | 2/1973 | Bernardi |
| 4,014,089 | A | 3/1977 | Sato et al. |
| 4,338,381 | A | 7/1982 | Rogers |
| 5,595,040 | A | 1/1997 | Chen |
| 6,059,482 | A | 5/2000 | Beauvoir |
| 6,230,467 | B1 | 5/2001 | Leek |
| 6,474,902 | B1 | 11/2002 | Beauvoir |
| 7,178,296 | B2 | 2/2007 | Houghton |
| 2004/0187430 | A1 | 9/2004 | Takeuchi et al. |
| 2005/0257451 | A1 | 11/2005 | Pryor et al. |
| 2006/0144006 | A1 | 7/2006 | Suzuki et al. |
| 2007/0234666 | A1 | 10/2007 | Porter |
| 2011/0308190 | A1 | 12/2011 | Pryor et al. |
| 2014/0062648 | A1 | 3/2014 | McManus et al. |
| 2015/0225972 | A1 | 8/2015 | Tsai |
| 2017/0067249 | A1 | 3/2017 | Matteson |
| 2019/0249410 | A1 | 8/2019 | Richards |
| 2019/0292783 | A1 | 9/2019 | Pryor et al. |

FOREIGN PATENT DOCUMENTS

| | | | | |
|---|---|---|---|---|
| KR | 2020065414 | A * | 6/2020 | ............. E04H 9/021 |
| TW | 200936910 | | 9/2009 | |
| TW | 200936910 | A * | 9/2009 | ........... H04L 49/351 |
| WO | 2004076761 | | 9/2004 | |

OTHER PUBLICATIONS

International Search Report and Written Opinion dated Dec. 18, 2020 in International Patent Application No. PCT/US2020/050510.
Office Action dated Sep. 17, 2020 in U.S. Appl. No. 16/570,906.
English Language Abstract for WO2004076761 published Sep. 10, 2004.
English Language Abstract for JP2009209592 published Sep. 17, 2009.
Response to Office Action dated Jan. 19, 2021 in U.S. Appl. No. 16/570,906.
Notice of Allowance and Fee(s) Due dated Mar. 24, 2021 in U.S. Appl. No. 16/570,906.
Communication pursuant to Rules 161(1) and 162 EPC dated Apr. 22, 2022 in European Patent Application No. 20781414.6.
Response to Communication pursuant to Rules 161(1) and 162 EPC filed Oct. 31, 2022 in European Patent Application No. 20781414.6.

* cited by examiner

STRUCTURAL FUSE WITH INTEGRAL SPACER PLATES

CLAIM OF PRIORITY

This application is a continuation application of U.S. patent application Ser. No. 16/570,906, filed Sep. 13, 2019 entitled "STRUCTURAL FUSE WITH INTEGRAL SPACER PLATES", to be issued as U.S. Pat. No. 11,072,938 on Jul. 27, 2021, which application is incorporated herein by reference in its entirety.

BACKGROUND

Structural fuses are known for use in homes, buildings and other structures for dissipating stresses in the structural connections and frames upon seismic, wind or other loads on the structures. For example, the Yield-Link® structural fuse from Simpson Strong-Tie, Pleasanton, Calif., may be used at a connection of a beam to a column so that, when loads on the structural connection reach a threshold, the structural fuse yields to dissipate energy without damage to the beam or column. Thereafter, the damaged structural fuse may be removed and replaced without having to otherwise repair the connection.

A typical structural fuse includes a base and a plate welded orthogonally to the base. The plate may include a midsection having a small diameter as compared to the ends of the plate, the midsection designed to be the area where yielding occurs. In use, the base may be bolted to a column. The plate may have a surface lying adjacent to the beam, with an end of the plate, opposite the base, bolted to the beam. A planar buckling restraint plate (BRP) may overlie the reduced diameter midsection, on a second surface of the plate, opposite the first surface facing the beam. The BRP may be bolted into the beam to sandwich the plate in place and prevent buckling of the plate under compressive loads. Spacers may thereafter be placed in the slots defined by the smaller diameter midsection of the yield plate to evenly distribute loads on the plate and the BRP, when the BRP is bolted to the beam. It is important that these spacers match the plate in thickness, grain and other properties to ensure even load distribution on the plate and BRP during seismic and other loads on the structural fuse.

SUMMARY

The present technology relates to a structural fuse configured to be mounted between a column and beam used in homes, buildings and other structures. The structural fuse includes a fuse base and a fuse plate extending from the fuse base. The fuse plate may include a reduced diameter yield section configured to yield at loads on the structural fuse above a threshold. The reduced diameter yield section includes a pair of slots on either side of the yield section, which slots receive a pair of spacers. In accordance with aspects of the present technology, the spacers are integrally formed as part of the fuse plate, and remain attached to the fuse plate during fabrication of the structural fuse.

In one example, the present technology relates to a structural fuse for use in affixing first and second structural members to each other, the structural fuse comprising: a fuse base configured to be affixed to the first structural member; a fuse plate configured to be affixed to the second structural member, the fuse plate comprising: a proximal section at a first end of the fuse plate adjacent the fuse base, a distal section at a second end of the fuse plate opposite the first end, and a yield section between the proximal and distal sections, the yield section having first and second edges defining a reduced width relative to a width between edges of the proximal and distal sections, and the yield section configured to yield; and first and second spacers integrally attached to the fuse plate, the first spacer positioned adjacent the first edge of the yield section, and the second spacer positioned adjacent the second edge of the yield section.

In another example, the present technology relates to a structural fuse assembly for use in affixing first and second structural members to each other, the structural fuse comprising: a fuse base configured to be affixed to the first structural member; a fuse plate configured to be affixed to the second structural member, the fuse plate comprising: a proximal section at a first end of the fuse plate adjacent the fuse base, a distal section at a second end of the fuse plate opposite the first end, and a yield section between the proximal and distal sections, the yield section having first and second edges defining a reduced width relative to a width between edges of the proximal and distal sections, and the yield section configured to yield; first and second spacers integrally attached to the fuse plate, the first spacer positioned adjacent the first edge of the yield section, and the second spacer positioned adjacent the second edge of the yield section, wherein each of the first and second spacers comprising a set of one or more holes; a buckling restraint plate configured to cover the yield section and sandwich the yield section between the buckling restraint plate and second structural member to resist buckling of the yield section, wherein fasteners extend through the buckling restraint plate, through the one or more holes in the first and second spacers and into the second structural member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present technology, roughly described, relates to a structural fuse configured to be mounted between a column and beam used in homes, buildings and other structures. The structural fuse includes a fuse base configured to be mounted to the column, and a fuse plate extending from the base and configured to be mounted to the beam. The fuse plate may include a proximal section adjacent the fuse base, and a distal section for affixing the fuse plate to the beam. A reduced diameter yield section is provided between the proximal and distal sections. The yield section is configured to yield at loads on the structural fuse above a threshold. The reduced diameter yield section includes a pair of slots on either side of the yield section, which slots receive a pair of spacers. In accordance with aspects of the present technology, the spacers are integrally formed as part of the fuse plate, and remain attached to the fuse plate, for example at the distal end of the fuse plate adjacent the yield plate.

Forming some the spacers integrally with the fuse plate provides several advantages. First, it is important that the spacers be the same thickness as the fuse plate to within a tight tolerance. Forming the spacers and the fuse plate from the same web and leaving the spacers attached ensures this tight tolerance is met. Second, when steel is heated in a certain way, a grain of the steel may align to polar north. Forming the fuse plate and spacers integrally with each other ensures the grain of the fuse plate and spacers are aligned, which in turn ensures uniform properties and response of the fuse plate and spacers. Third, leaving the spacers integrally attached simplifies fabrication of the structural fuse. Fourth, leaving the spacers make it easier for connection installation where the spacers cannot get lost or dropped down and become a falling hazard.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

Figure 1:
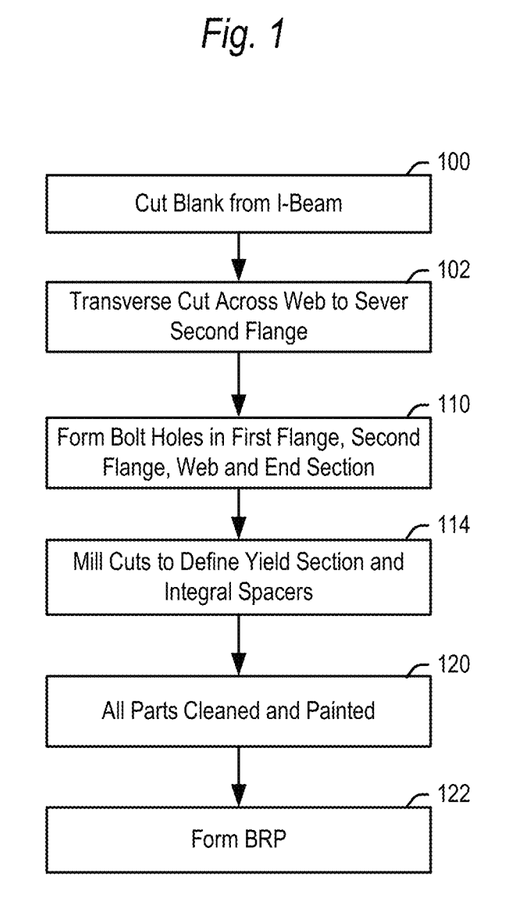
FIG. 1 is a flowchart of a method for fabricating a structural fuse according to embodiments of the present technology.

FIG. 1 is a flowchart of one embodiment for forming a structural fuse according to the present technology. A structural fuse is initially taken from a conventional structural steel component such as a beam 200, shown in FIG. 2. The beam 200 may have first and second flanges 202 and 204, respectively, and a web 206 extending between the first and second flanges. In one example, the flanges 202, 204 may have a thickness of $1^{13}/_{16}$ inches, though the thickness of the flanges may vary in further embodiments. In one example, the web 206 may have a thickness of 1 inch, ¾ inch or ½ inch, though the thickness of the web may vary in further embodiments. The beam 200 may have a maximum width (between the exterior surfaces of flanges 202, 204) of $40^{3}/_{16}$ inches, though this width may vary in further embodiments.

Figure 3:
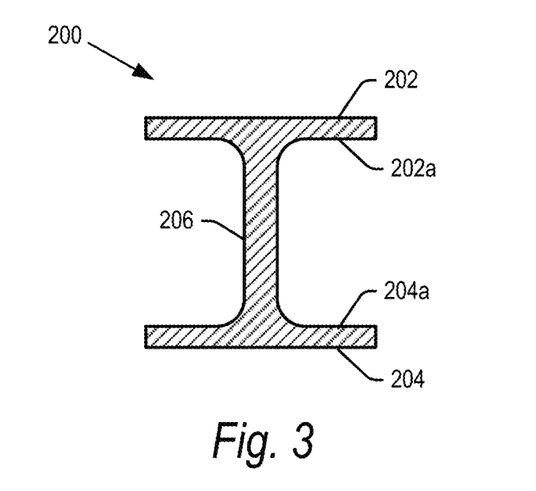
FIGS. 3 and 4 show cross-sectional views of different configurations of a beam from which a structural fuse according to the present technology may be fabricated.
Figure 4:
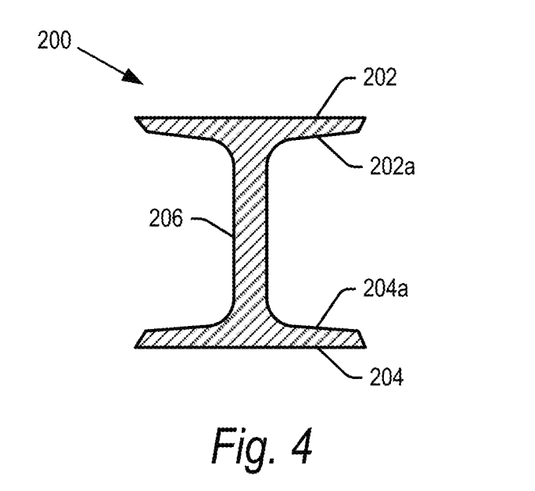

The flanges may be formed in a so-called standard structural W-shape, where interior surfaces 202*a*, 204*a* of the flanges 202 and 204 are orthogonal to the surfaces of the web 206 (FIG. 3). Alternatively, the flanges may be formed in a so-called S-section, where the interior surfaces 202*a*, 204*a* form an angle greater than 90° with the surfaces of the web 206 (FIG. 4). Other configurations of beams are contemplated. As explained below, in one embodiment, the first and second flanges 202, 204 form the fuse base and buckling restraint plate (BRP), respectively, in the finished structural fuse. The web 206 may form the fuse plate. However, it is conceivable that two or more of the fuse base, fuse plate and BRP not come from the same piece of steel.

Figure 2:
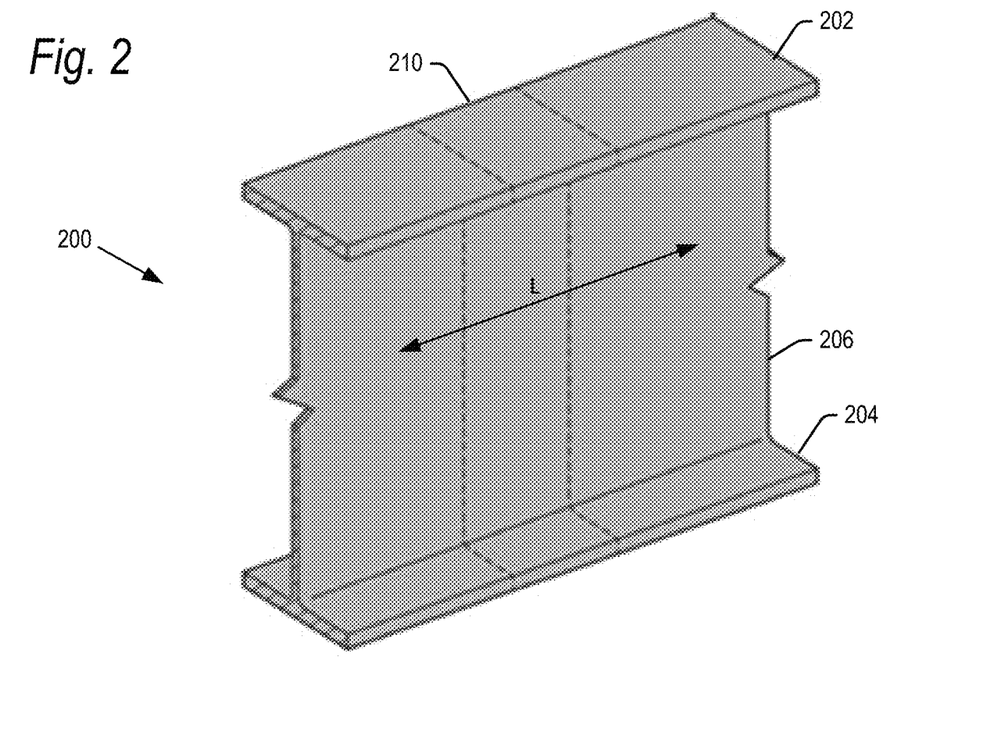
FIG. 2 shows a section of a beam from which multiple structural fuses may be fabricated according to embodiments of the present technology.
Figure 5:
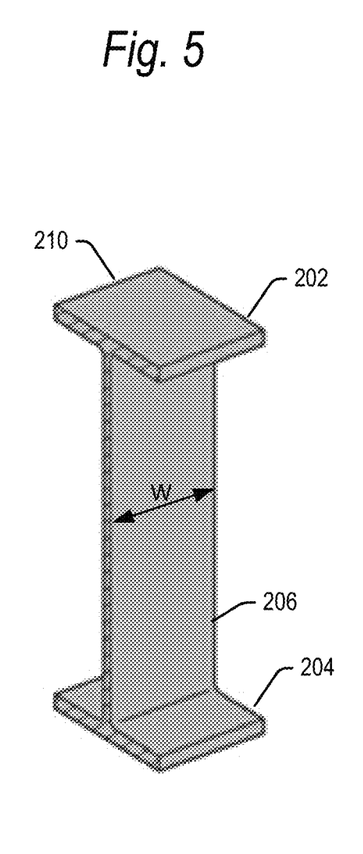
FIG. 5 shows a section of a beam from which a structural fuse according to embodiments of the present technology may be fabricated.

In step 100, a section of the beam 200 is cut from the beam in a direction transverse to a length (L, FIG. 2). This section, referred to herein as blank 210, is indicated in FIG. 2 and is shown in FIG. 5. Blank 210 includes first flange 202, second flange 204 and web 206. As shown in FIG. 5, the blank 210 may have a width, W, of 12 inches, but this width may vary in further embodiments. The blank 210 may be cut from beam 200 by various methods including for example computer numeric control (CNC) plasma cutting. The PythonX robotic plasma cutting system by Burlington Automation Corp. of Ontario Canada is one example of such a cutting system. Other cutting methods such as by saw blade are possible.

Figure 6:
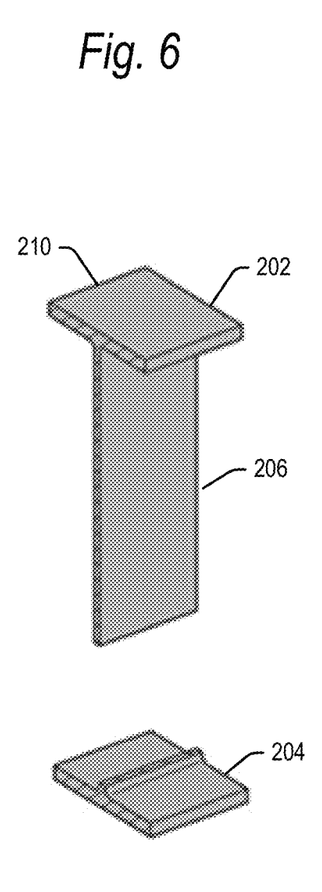
FIG. 6 illustrates the beam of FIG. 5 severed into discrete sections forming the structural fuse and buckling restraint plate.

In step 102, a transverse cut is made adjacent to the second flange 204 to separate the flange 204 from the web 206 as shown in FIG. 6. As explained below, the separated second flange 204 may be processed into the BRP in the structural fuse. The transverse cut may be made by CNC plasma cutting, by a cutting blade or other cutting methods. At this point, the flange 202 forms a fuse base 212, and the web 206 forms a fuse plate 216. In an alternative embodiment, the fuse base 212 and fuse plate 216 may be formed from two different pieces of steel, which are joined together for example by welding.

Figure 7:
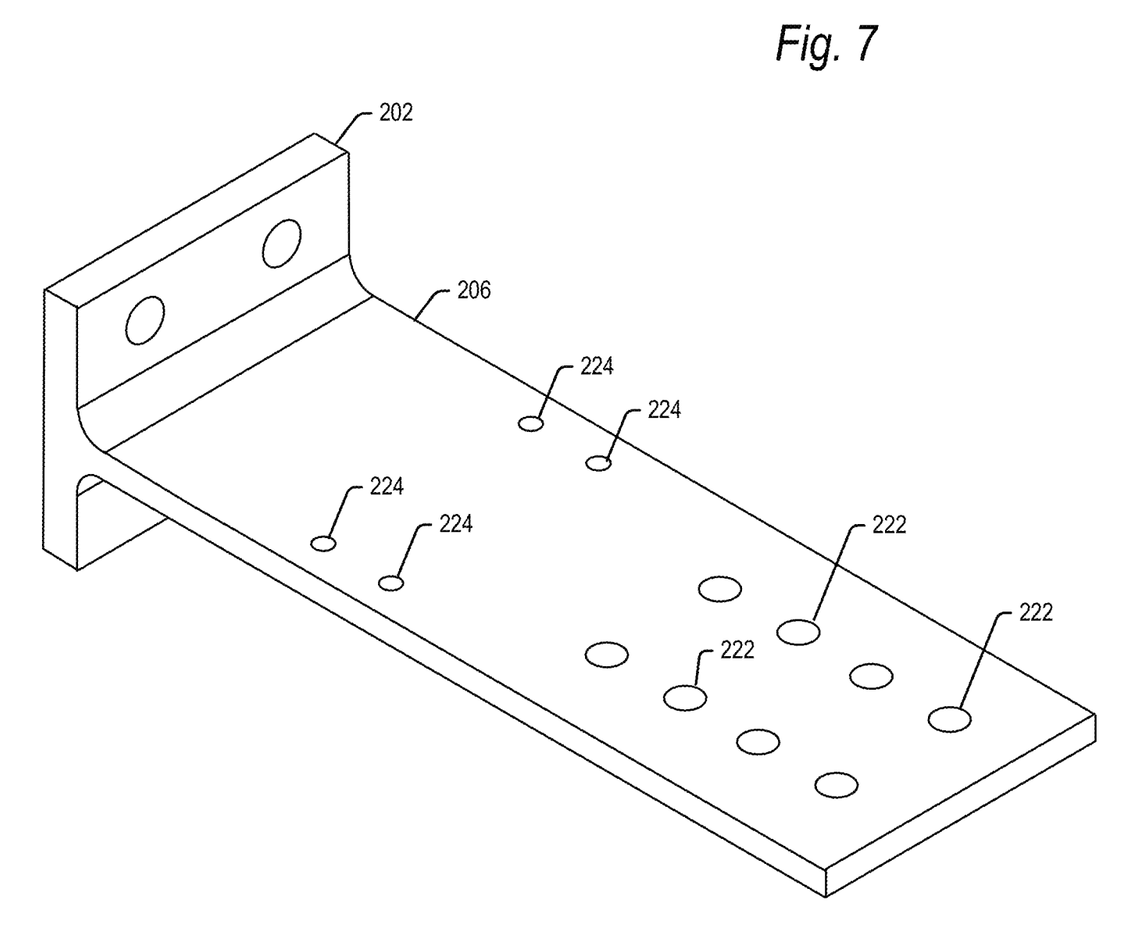
FIG. 7 is a perspective view showing holes formed in the severed blank of FIG. 6 according to embodiments of the present technology.

In step 110, bolt holes may be formed in the fuse base 212 and the fuse plate 216. For example, as shown in FIG. 7, bolt holes 220 may be formed in the fuse base 212 and bolt holes 222, 224 may be formed in fuse plate 216. The particular arrangement of bolt holes in the fuse base and plate is by way of example, and the location and size of the holes may vary in alternative embodiments. The holes 220, 222 and 224 may be formed by various methods including by the True Hole® hi-definition plasma cutting system from Hypertherm, Inc. of New Hampshire, USA. The holes 220, 222 and 224 may be formed by other methods including drilling in further embodiments.

Figure 8:
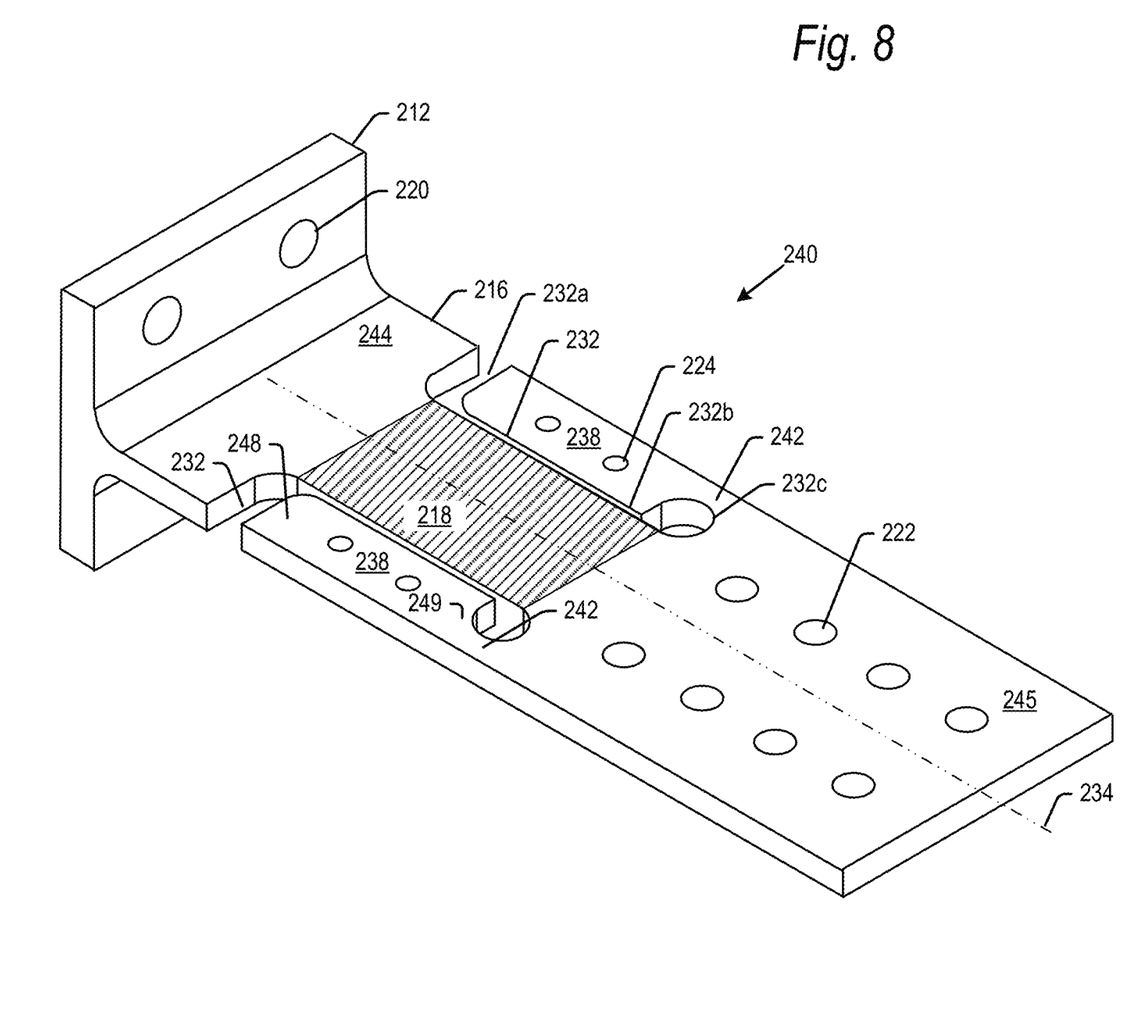
FIG. 8 is a perspective view of a completed structural fuse according to embodiments of the present technology.

In step 114, the fuse plate 216 is milled. This step provides two features within the structural fuse. First, the milling defines a reduced-diameter section, referred to herein as the yield section 218. Second, the milling defines spacers 230 to the sides of the yield section 218. These features result in the structural fuse 240 shown in FIG. 8. These features are described in greater detail below.

Using for example CNC plasma cutting, a multi-dimensional channel cut 232 is made in both sides of the fuse plate 216, symmetrical about a centerline 234. Each channel cut 232 includes an inlet gap 232a milled in from the sides 228 of the fuse plate 216 transversely toward a centerline 234 of the fuse plate 216, and a slit 232b continuing from inlet gap 232a parallel to the centerline 234. The slit 232b ends in a channel hole 232c. The pair of multi-dimensional channel cuts define the reduced-diameter yield section 218 (shown in cross-hatch in FIG. 8). As is known in the art, given the reduced diameter of yield section 218, yielding of the structural fuse occurs within and along the yield section 218 upon tensile and/or compressive loads above some predefined threshold.

In accordance with aspects of the present technology, the multi-dimensional channel cuts 232 also define spacers 238 adjacent to the yield section 218, on both sides of the yield section 218. The spacers 238 are physically detached from the yield section 218 (by cut 232), but remain affixed to the fuse plate 216, for example at lands 242. The integral spacers 238 serve to evenly distribute loads exerted by the BRP as explained below.

The yield section 218 may divide the fuse plate 216 into three separate sections: a proximal section 244 adjacent the fuse base 212, the yield section 218, and a distal section 245 (including bolt holes 222) on the opposite side of the yield section 218 from the proximal section 244. The spacers 238 also include a proximal end 248 nearest the fuse base 212, and a distal end 249 farthest from the fuse base 212. In the embodiment shown in FIG. 8, the lands 242 are provided at the distal end 249 of the spacers 238, either in the proximal section 244, or in the yield section 218 adjacent the proximal section 244. However, as explained below, the lands 242 connecting the spacers 238 to the fuse plate 212 may be in other locations in further embodiments.

Figure 9:
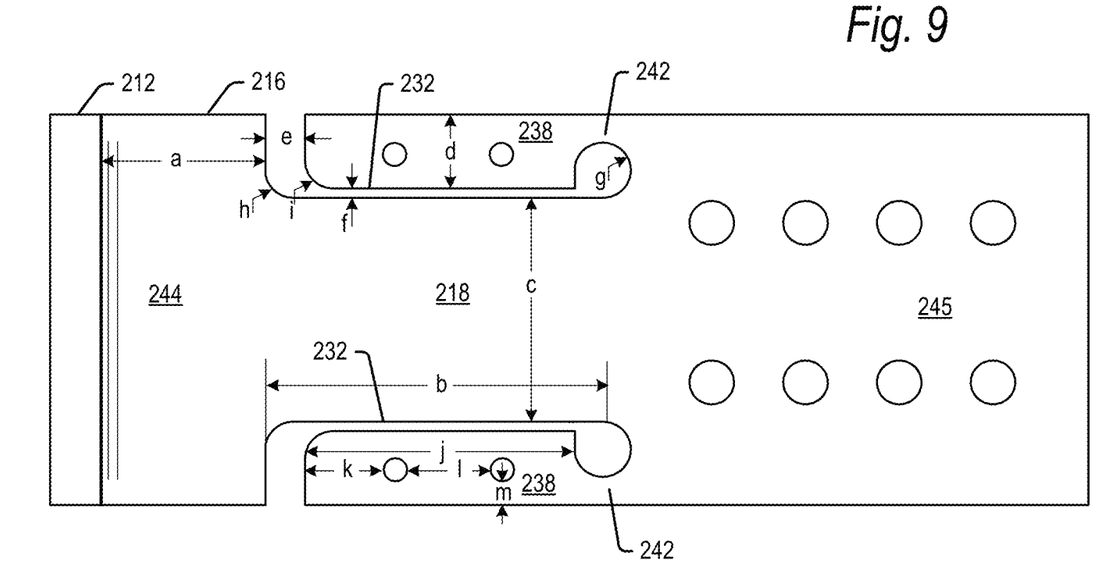
FIG. 9 is a top view of a completed structural fuse including labeled dimensions according to embodiments of the present technology.

FIG. 9 shows a top view of the structural fuse 140 and fuse plate 216 including some sample dimensions. In one example, the dimension "a" may be 5 inches, "b" may be 12 inches, "c" may be 6 inches, "d" may be 2.5 inches, "e" may be 2 inches, "f" may be ¼ inch, "g" may be 1 inch, "h" may be 1 inch, "i" maybe 1 inch, "j" might be 8 inches, "k" may be 2.5 inches, "l" may be 3 inches and "m" might be 1 inch. The dimension "e" is selected to be large enough so that, upon compression of the yield section, the spacers 238 to not contact the proximal section 244 of the fuse plate 216. The dimension "f" is selected to be large enough so that, upon lateral expansion of the yield section (along dimension "c"), the spacers 238 do not contact the yield section 218 of the fuse plate 216. Conversely, the dimension "f" is selected to be small enough so that, upon lateral shrinking of the yield section per Poisson's ratio, the spacers remain near to the yield section 218.

It is understood that each of the above dimensions is by way of example only and each may vary, proportionately or disproportionately with respect to each other, in further embodiments.

Figure 10:
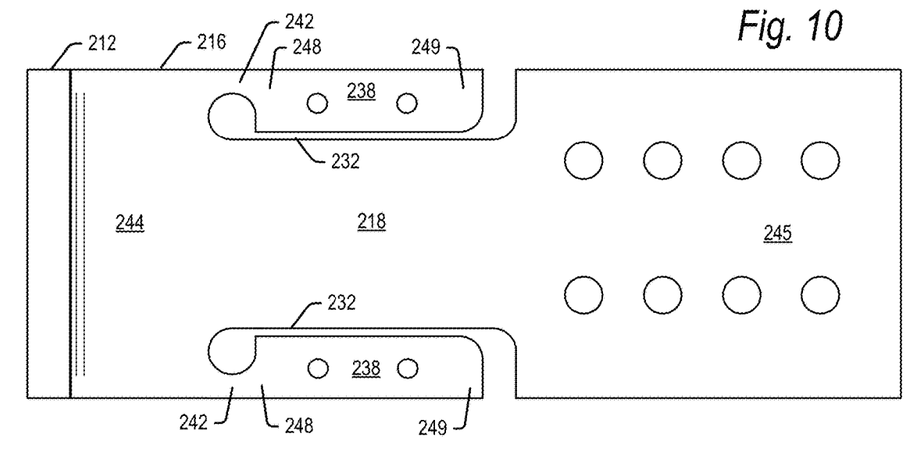
FIG. 10 is a top view of a completed structural fuse according to an alternative embodiment of the present technology.
Figure 11:
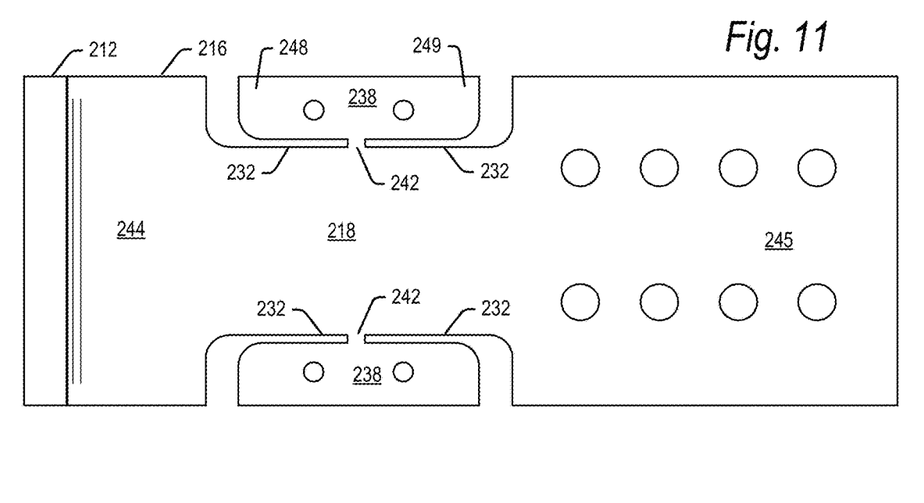
FIG. 11 is a top view of a completed structural fuse according to a further alternative embodiment of the present technology.

It is a feature of the present technology that the spacers 238 remain integrally attached to the fuse plate 216 (at lands 242) upon formation of the reduced-diameter yield section 218. The lands 242 by which the spacers 238 remain attached are positioned at the distal ends 249 of spacers 238 in the embodiment shown in FIG. 8. As noted, the lands 242 may be positioned at other locations in further embodiments. For example, FIG. 10 shows an example where the lands 242 are located at the proximal ends 248 of spacers 238. FIG. 11 shows a further example where the lands 242 are positioned at a mid-section of each spacer 238, between the proximal and distal ends 248, 249. In FIG. 11, the lands 242 are centered along the length of the yield section 218, though the lands 242 need not be centered in further examples.

The size of the channel hole 232c defines the width of lands 242 (orthogonal to the side edges 228). The lands 242 may have a larger or smaller width depending upon the size of channel holes 232c. In further embodiments, the channel holes 232c may be omitted entirely, so that the channel cut 232 ends at slit 232b (or that the channel holes 232c have the same diameter as a width of the slits 232b). In such an embodiment, the lands 242 would be the full width of spacers 238.

After formation of the structural fuse 240, all parts may be cleaned and painted or powder coated, for example with PMS172 orange, in step 120. Step 120 may include blasting the structural fuse 240 to remove any slag from plasma or other elevated temperature cutting processes. It may also remove scale which may result from the rolling fabrication process of the beam 200. The cleaning step 120 may also remove any rust from the structural fuse 240.

It is understood that a number of the above-described steps may be performed in a different order. For example, it is understood that the sequence of steps including the transverse cut (step 102), the formation of the bolt holes (step 110), and the milling of the channel cut (step 114) maybe performed in any order in further embodiments.

In step 122, the BRP 246 (FIG. 13) may be formed. As noted above, in embodiments, the BRP 246 may be formed from the second flange 204 cut away from the structural fuse 240 in step 102. In such embodiments, after separation from the beam 200, the BRP 246 may be milled to remove any remnants of the web 206 to form the BRP into a planar plate. The BRP may be formed from steel that was not initially part of beam 200 in further embodiments. In any case, the BRP may be milled or otherwise processed to provide a planar plate, and bolt holes may then be formed in the BRP to affix the BRP to a beam over the fuse plate 212 as explained below. After the BRP 246 is formed, it may be cleaned, painted and/or powder coated as explained above.

Figure 12:
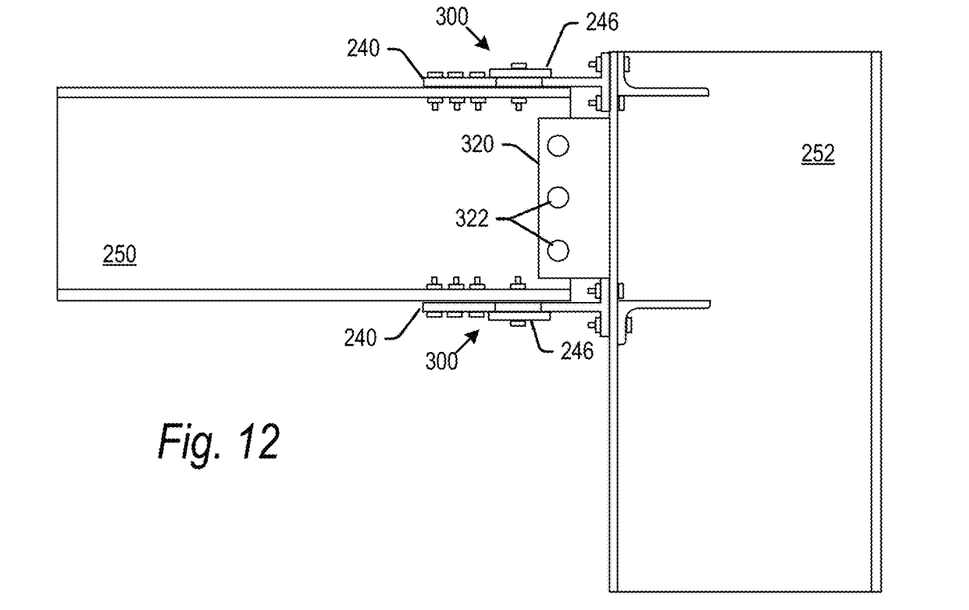
FIG. 12 shows a pair of structural fuses according to embodiments of the present technology used at a connection between a beam and column in a structure.
Figure 13:
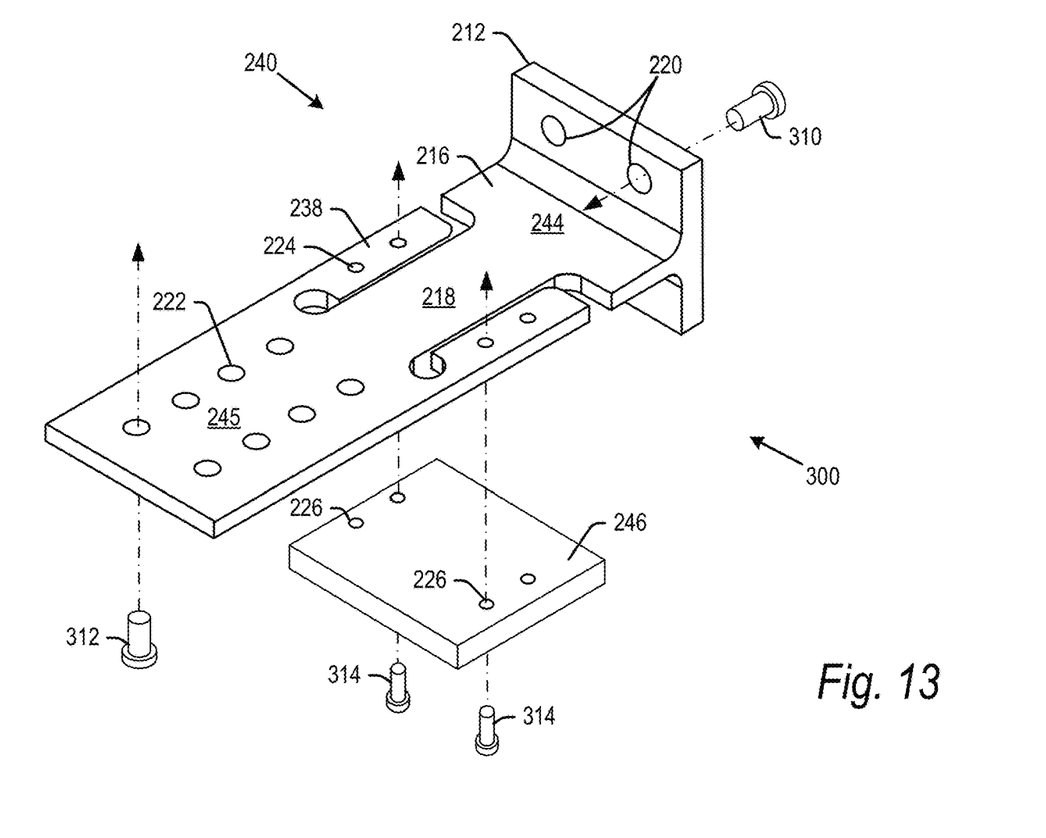
FIG. 13 shows an exploded perspective view of one of the structural fuses of FIG. 12.

FIG. 12 shows a beam 250 connected to the column 252 by a pair of structural fuse assemblies 300 according to the present technology. Each structural fuse assembly 300 includes a structural fuse 240 and a BRP 246. FIG. 13 illustrates an exploded perspective view of a structural fuse assembly 300 used in the connection of FIG. 12. As shown in FIG. 12, a structural connection, such as the connection of beam 250 to column 252, may include a pair of structural fuse assemblies 300, one at the top of the beam and one at the bottom. In operation, the pair of structural fuse assemblies 300 operate in tandem to oppose rotation of the beam relative to the column under a lateral load. Attempted rotation in a first direction will place the first of the assemblies 300 in tension and the second assembly 300 in compression. Attempted rotation in the opposite direction will place the second assembly 300 in tension and the first assembly 300 in compression.

As shown in FIGS. 12 and 13, each structural fuse assembly 300 includes a structural fuse 240 having a column-mounted fuse base 212 and a beam-mounted fuse plate 216. As noted above, the fuse plate 216 includes proximal section 244, yield section 218 and distal section 245. In embodiments, the structural fuse assembly 300 further includes the BRP 246 and the pair of spacers 238.

In order to affix a structural fuse assembly 300 between a beam 250 and column 252, the fuse base 212 may initially be affixed to the column 252, either at the jobsite or remote from the jobsite. As noted above, the fuse base 212 may include bolt holes 220 (FIG. 13) for receiving bolts 310 (one of which is shown in FIG. 13) to bolt the fuse base 212 to the column. While four bolt holes 220 are indicated (two above fuse plate 216 and two below), there may be more or less bolt holes 220 in further embodiments. While bolts may be preferable, it is contemplated that the fuse base 212 may alternatively or additionally be affixed to the column 252 by welding or gluing.

Thereafter, at the jobsite, the beam-mounted fuse yield plate 216 may be bolted to the beam 250 via a plurality of bolts 312 (one of which is shown in FIG. 13) through bolt holes 222. While the figures show six bolts holes 222, there may be more or less than that in further embodiments. At this point, the structural fuse 240 is affixed to both the beam 250 and column 252. The beam and column may also be attached to each other by a shear tab 320 (FIG. 12). Shear tab 320 may be affixed to the column 252 as by welding, gluing or bolting to a flange of column 252 and to the web of beam 250 as by bolts 322. In further embodiments, the fuse plate 216 may initially be mounted to a beam 250, at the jobsite or remotely, and thereafter, the fuse base 212 may be affixed to a column 252 at the jobsite.

The BRP 246 may next be affixed to beam 250 over the reduced-diameter yield section 218 of the fuse plate 216. As seen for example in FIG. 13, a number of bolts 314 (only two shown) fit through bolt holes 226 in BRP 246, through holes 224 formed in the integrated spacers 238, and into holes formed in a flange of the beam 250, where the bolts may receive a nut to fasten the bolts in place. The spacers 238 take up at least a substantial portion of the spaces on either side of yield section 218. It is important that the spacers 238 have the same thickness as the fuse plate 216 to tight tolerances, such as for example to within 0.125 inches. As the spacers 238 are integrally formed from the fuse plate 216, in accordance with the present technology, and are in fact never separated from fuse plate 216, the yield plate and spacers may have the same thickness to within the desired tolerances.

The respective structural fuse assemblies 300 shown in FIG. 12 provide high initial stiffness and tensile resistance to relative movement between structural members such as the beam 250 and column 252 under lateral loads, but provides stable yielding and energy dissipation under lateral loads above a predictable, controlled and predefined level. In particular, the bending strength of the column and beam could be designed to exceed the moment capacity of the pair of structural fuse assemblies 300, and in particular, the narrow width areas of the yield sections 218. Thus, the fuse plates 216 yield under lateral loads before yielding or failure of the column or beam, and any damage is limited to the fuse assemblies 300 which may be easily removed and replaced. The BRPs 246 prevent buckling of the structural fuse plates 216 under a compressive load. The shear tab 320 is provided to oppose vertical shear (i.e., along the length of column 252) under a vertical load.

It is understood that the components of the structural fuse assembly 300 may have different dimensions within the scope of the present technology. However, the following are examples of some dimensions. The fuse base 212 may have a length of 12 inches, and a width of 10 inches. The fuse plate 216 may extend from the fuse base 212 halfway along the width of the fuse base. To the extent the final width of the fuse base 212 differs from the width of the beam 200 from which the fuse base comes, unused portions of the beam 200 above and below the width of the fuse base 212 may be cut and discarded, for example by CNC plasma cutting.

The fuse plate 216 may have a width of 12 inches and a length of 36 inches. As noted above, the yield section 218 may be spaced 6 inches from the fuse base, and may have a length of 12 inches and a width of 6 inches. The BRP 246 may have a length and width of 12 inches. As mentioned, each of the above dimensions may vary, proportionately and disproportionately with each other, in further embodiments of the technology.

In fabrication, multiple blanks 210 (FIG. 2) may be cut from a length of beam 200. In embodiments, structural fuse assemblies 300 from blanks 210 taken from anywhere on a beam may be used as the top and bottom assemblies 300 shown in FIG. 12. However, in further embodiments, components from two adjacent blanks may be used in two structural fuse assemblies 300 that are used together at the same connection. For example, the pair of structural fuse assemblies 300 shown at the beam/column connection in FIG. 12 may come from blanks that were adjacent to each other on the beam 200. This ensures that the structural fuse assemblies 300 at the top and bottom of a beam/column connection have the same characteristics and exhibit the same stress responses.

As noted above, when steel is heated to at least a predefined temperature, crystals in the steel can align in the same direction to give the steel a grain. Given that the spacers 238 come from the same blank as fuse plate 216, it is a further advantage of the present technology that the grain of components used in the structural fuse 140 may be aligned with each other. This advantageously ensures that the properties of the spacers, and the response to stresses by the spacers, will be same as that of the fuse plate 216.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A structural fuse for use in affixing first and second structural members to each other, the structural fuse comprising:
   a yield plate configured to be connected between the first and second structural members, the yield plate, comprising:
      a first section adjacent the first structural member, the first section having a first width;
      a second section adjacent the second structural member, the second section having a second width;
   a yield section between the first and second sections, the yield section having a third width less than the first and second widths, the smaller width defining at least a first notch on at least a first side of the yield section, the yield section configured to yield; and at least a first spacer positioned in the first notch, the first spacer having a first section spaced from the yield section, and a second section integrally attached to the yield plate at a first land at a base of the first spacer;
wherein a hole formed in the base of the first spacer defines a size of the first land.

2. The structural fuse of claim 1, wherein the first spacer comprises a proximal end nearest the first section and a distal end nearest the second section, and wherein the land integrally attaching the spacer to the yield plate is at the distal end of the first spacer.

3. The structural fuse of claim 1, wherein the first spacer comprises a proximal end nearest the first section and a distal end nearest the second section, and wherein the land integrally attaching the spacer to the yield plate is at the proximal end of the first spacer.

4. The structural fuse of claim 1, wherein the first spacer comprises a proximal end nearest the first section and a distal end nearest the second section, and wherein the land integrally attaching the spacer to the yield plate is between the proximal and distal ends of the first spacer.

5. The structural fuse of claim 1, wherein the first spacer is the same thickness as the yield section.

6. The structural fuse of claim 1, further comprising a second notch in the yield section on an opposite side of the yield section from the first notch, and a second spacer spaced from the yield section, but integrally attached to the yield plate by a second land at a base of the second spacer.

7. A structural fuse assembly for use in affixing first and second structural members to each other, the structural fuse comprising:
a yield plate configured to be connected between the first and second structural members, the yield plate, comprising:
a first section adjacent the first structural member, the first section having a first width;
a second section adjacent the second structural member, the second section having a second width;
a yield section between the first and second sections, the yield section having a third width less than the first and second widths, the smaller width defining at least a first notch on at least a first side of the yield section, the yield section configured to yield; and
first and second spacers integrally attached to the fuse plate by first and second lands at a base of the first and second spacers, the first spacer positioned adjacent the first edge of the yield section, and the second spacer positioned adjacent the second edge of the yield section, wherein each of the first and second spacers comprise a set of one or more holes;
a buckling restraint plate configured to cover the yield section and sandwich the yield section between the buckling restraint plate and second structural member to resist buckling of the yield section, wherein fasteners extend through the buckling restraint plate, through the one or more holes in the first and second spacers and into the second structural member;
wherein the spacers are defined by respective channel cuts formed in the yield plate, each channel cut leaving behind a land where each spacer remains affixed to the fuse plate; and
wherein each channel cut includes a channel hole defining a size of each of the first and second lands.

8. The structural fuse of claim 7, wherein each channel cut includes a slit defining a width of each spacer.

9. The structural fuse of claim 8, wherein the channel hole has a larger diameter than a width of the slit.

10. The structural fuse of claim 8, wherein the channel hole has a diameter equal to a width of the slit.

11. A structural fuse for use in affixing first and second structural members to each other, the structural fuse comprising:
a yield plate configured to be connected between the first and second structural members, the yield plate, comprising:
a first section adjacent the first structural member, the first section having a first width;
a second section adjacent the second structural member, the second section having a second width;
a yield section between the first and second sections, the yield section having a third width less than the first and second widths, the smaller width defining at least a first notch on at least a first side of the yield section, the yield section configured to yield; and
at least a first spacer positioned in the first notch, the first spacer separated along its length from the yield section but integrally attached to the yield plate at a first land at a base of the first spacer;
wherein a hole formed in the base of the first spacer defines a size of the first land.

12. The structural fuse of claim 11, wherein the first spacer is the same thickness as the yield section.

13. The structural fuse of claim 11, further comprising a second notch in the yield section on an opposite side of the yield section from the first notch, and a second spacer spaced from the yield section, but integrally attached to the yield plate by a second land at a base of the second spacer.

* * * * *